United States Patent [19]
Bjorndahl

[11] Patent Number: 5,406,616
[45] Date of Patent: Apr. 11, 1995

[54] METHOD OF COMPLETING A TELEPHONE CALL IN A TELEPHONE SYSTEM

[75] Inventor: Per S. Bjorndahl, Lidingö, Sweden

[73] Assignee: Telefonaktiebolaget L M Ericsson, Stockholm, Sweden

[21] Appl. No.: 191,913

[22] Filed: Feb. 4, 1994

[30] Foreign Application Priority Data

Feb. 5, 1993 [SE] Sweden .................................. 9300367

[51] Int. Cl.$^6$ ........................ H04M 11/00; H04L 9/00
[52] U.S. Cl. ........................................ 379/59; 380/46
[58] Field of Search ............... 340/905, 907; 370/95.3; 380/44, 46; 379/58, 59, 60, 63, 209, 215; 455/33.1, 33.2, 33.4, 54.1, 56.1

[56] References Cited

U.S. PATENT DOCUMENTS

| | | | |
|---|---|---|---|
| 4,899,374 | 2/1990 | Van Landeghem | 379/215 |
| 4,975,944 | 12/1990 | Cho | 379/209 |
| 5,091,942 | 2/1992 | Dent | 380/46 |
| 5,303,287 | 4/1994 | Laborde | 379/59 |
| 5,333,178 | 7/1994 | Norell | 379/59 |

FOREIGN PATENT DOCUMENTS

| | | |
|---|---|---|
| 503813 | 9/1992 | European Pat. Off. . |
| 2937643 | 5/1982 | Germany . |
| 2812953 | 11/1983 | Germany . |
| 2616062 | 5/1987 | Germany . |
| 3926305 | 2/1991 | Germany . |
| 4035400 | 8/1991 | Germany . |
| 416865 | 2/1981 | Sweden . |

OTHER PUBLICATIONS

C & P Telephone White Pages relating to certain optional services that include Repeat Call, pp. 37–41 (Jan. 1994).
Recommendation GSM 03.02 Network Architecture, Version 3.1.4, ETSI TC GSM (Jan. 15, 1990).
Patent Abstract of Japan, vol. 16, No. 18, JP 3-235563 (Oct. 21, 1991).
Patent Abstract of Japan, vol. 15, No. 448, JP 3-190494 (Aug. 20, 1991).
Patent Abstract of Japan, vol. 16, No. 340, JP 4-101596 (Apr. 3, 1992).
Delory, Treillard, "Security and Saturation Solutions for GSM", Telephone Engineer and Management, vol. 95 1990.
Rahnema, "Overview of the GSM System and Protocol Architecture" IEEE Communications Magazine, Apr. 1993.

Primary Examiner—Curtis Kuntz
Assistant Examiner—William Cumming
Attorney, Agent, or Firm—Burns, Doane, Swecker & Mathis

[57] ABSTRACT

A method of effecting automatic callback in a mobile telecommunication system. A calling subscriber is permanently connected to a public switched telephone network and a called subscriber is a mobile unit which moves in the public land mobile network. A centrally located home location register keeps an account of where all mobiles registered in the mobile telecommunication network are located, with the aid of local databases, so-called visitor location registers. The called subscriber calls the called subscriber and finds that the subscriber is busy. The calling subscriber then dials a code, wherewith a reference is stored in a queue in the home location register, this queue relating to the called subscriber. When the called subscriber is free to receive a call, the calling subscriber is informed to this effect. The calling subscriber then lifts his telephone receiver and a connection is set-up between the two subscribers. When the called subscriber answers, the call is considered to have been connected. The home location register (HLR) then removes the reference from the queue.

5 Claims, 6 Drawing Sheets

METHOD OF COMPLETING A TELEPHONE CALL IN A TELEPHONE SYSTEM

BACKGROUND

The present invention relates to a method of completing a telephone call from a calling subscriber to a called subscriber when the called subscriber does not answer the call. The subscribers are part of a telecommunication system which includes at least one cellular mobile telecommunication network. One of the subscribers is connected via the mobile telecommunication network and the other subscriber is connected via the mobile telecommunication network or via a public switched telephone network. The called subscriber is permanently registered in a home location register and temporarily registered in a visitor location register which is known to the home location register and incorporated in the mobile network.

Present-day mobile telephony is a rapidly growing technology. Many mobile telecommunication systems, among them the European GSM-system, have already passed through the first basic development phase and the system designers are now concentrating on further improvements to the systems, among other things with regard to system refinement and the introduction of optional services. The land-bound public switched telephone network has long included optional services such as "automatic callback when the called subscriber is busy with another call" or "automatic callback when the called subscriber does not answer". This known technique is based on a database in which the identities of the subscribers involved are established in connection with a telephone exchange which handles a calling subscriber and/or a called subscriber. The problem with transferring this technique to a mobile telecommunication system is that the subscribers are mobile in the system. Since a mobile subscriber often moves geographically in the telecommunication network or system, difficulties are encountered in locating the subscriber when it becomes possible to set-up a call connection, particularly when a long time has passed between initiating the "automatic callback service" and the execution of this service. Services of this nature are also found in certain mobile telecommunication systems. For instance, an automatic callback service is known to the art from Japanese Patent Specification JP 3-190,494. According to this known method, the identity numbers of both a calling and a called subscriber are stored in a memory location while waiting for the called subscriber to become available to receive the call. When the subscriber is available, a call connection is set-up with the aid of data taken from the memory location. The drawback with the technique described in this earlier patent specification is that the memory location is tied solely to the cell area in which the mobile was located when originally attempting to call the called subscriber. When the mobile moves outside this cell area, it is no longer possible to locate the mobile and the technique is therefore only suitable for use in smaller networks. The Japanese Patent Specification JP 3-235,563 also discloses an automatic callback method, in which subscriber data is stored in a called mobile unit. Although this method solves the problem of finding the mobile, it requires the provision of additional equipment in each mobile unit that wishes to avail itself of this service.

SUMMARY

The object of the present invention is to provide for automatic callback in a cellular mobile telecommunication network even in those cases when a calling subscriber and/or a called subscriber has/have travelled a long distance in the network from the time of initiating the callback service to the time at which the service is carried out. The aforesaid problems are solved in accordance with the invention by storing the location identity characters of the two subscribers in an existing central database in the mobile telecommunication network. The central database, the so-called home location register HLR has the traditional purpose of keeping an account of the whereabouts in the network of all mobile units that are registered in the system and are located in the network at that moment in time. This is made possible by connecting the home location register HLR to all local databases in the system, the so-called visitor location registers VLR in which there is stored a traffic area code which discloses the geographic positions of the mobile units at each moment in time. According to the invention, the ability of the home location register HLR to know in which visitor location registers all mobile units are registered is used to locate the aforesaid subscribers prior to callback. This enables calls to be connected even when the subscribers have moved from a first to a second visitor location register in the time lapse between initiating callback and executing callback. In this regard the mobile subscribers concerned require no additional equipment, as distinct from earlier known techniques in which additional equipment was necessary. The invention will now be described in more detail with reference to preferred embodiments thereof and also with reference to the accompanying drawings.

DETAILED DESCRIPTION

A GSM-type public land mobile network, PLMN, includes a gateway mobile telephone services switching centre which is connected to several local mobile services switching centres, each of which is connected in turn to a plurality of base station controllers. The GSM-network is well specified in the so-called GSM-recommendations and the network architecture is particularly described in recommendation GSM 03.02. Each base station controller is connected to a plurality of base stations, each of which supervises a geographical area, called a cell. The PLMN-network also includes a central database, a so-called home location register, which is connected to the gateway or central mobile telephone services switching centre and also to all local mobile telephone switching centres in the PLMN-network. Those mobile units which subscribe to the mobile telecommunication network are registered in the home location register. Each local mobile telephone switching centre includes a local database called a visitor location register, in which all mobile units that are located with one of the cells handled by the local mobile telephone services switching centre at any given moment in time are registered.

Figure 1:
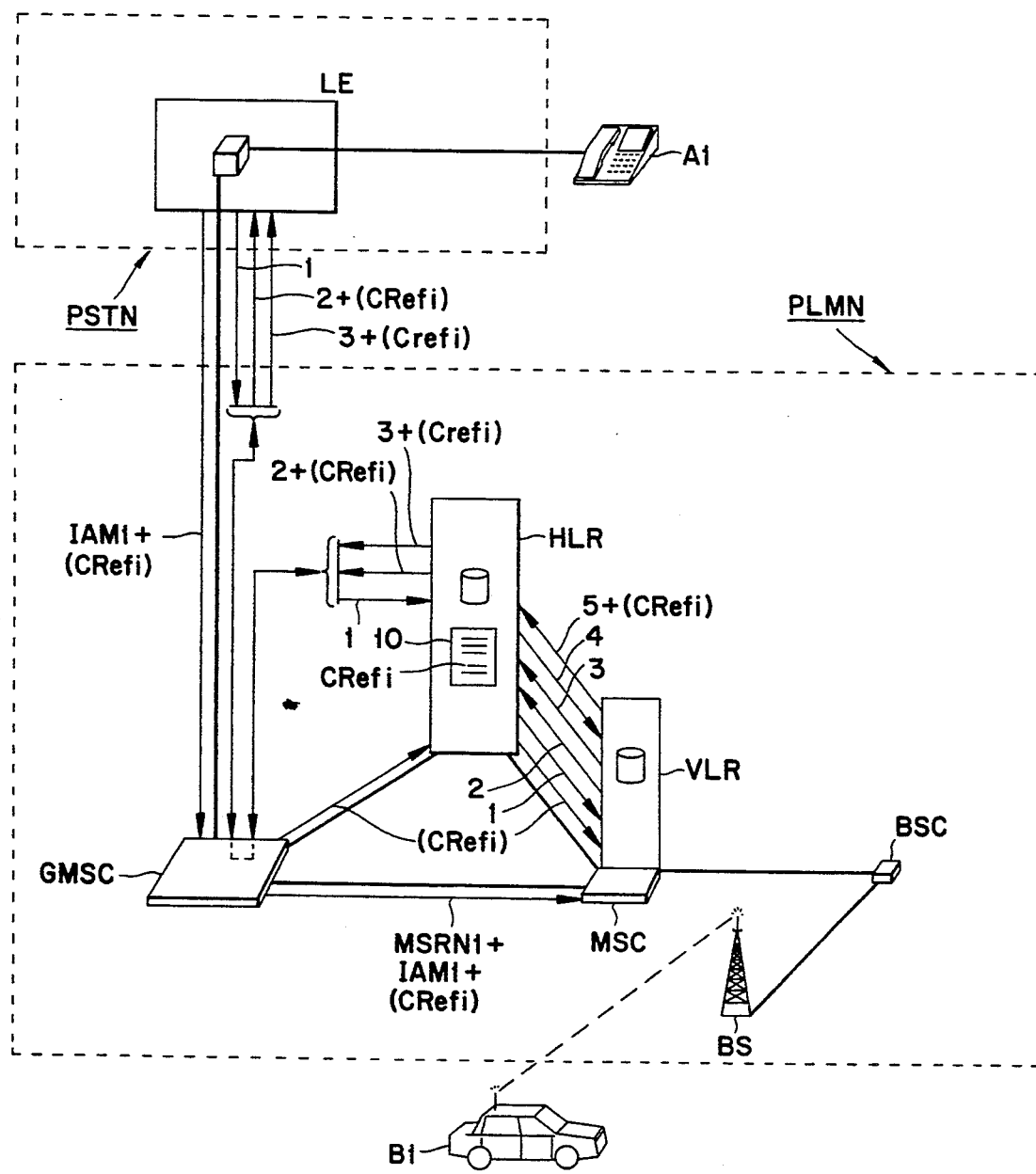
FIG. 1 is a block schematic which illustrates a traffic situation between a calling subscriber in a land-bound public switched telephone network and a called subscriber in a GSM-type cellular mobile telecommunication network.

The FIG. 1 illustration shows only one of the local mobile services switching centres MSC, base station controllers BSC, visitor location registers VLR and base stations BS, that are required to carry out the present invention. Multiples of these units have been omitted from the Figure for reasons of clarity. A mobile unit B1 belonging to the public land mobile network PLMN and located at that moment within a cell area which is controlled by the visitor location register VLR is registered temporarily in the visitor location register VLR and permanently in the aforesaid home location register HLR at the same time. The home location register HLR is always informed of the visitor location register VLR in which the mobile unit B1 is registered at that moment in time. FIG. 1 also shows the parts of a land-bound public switched telephone network necessary to the invention. The public telephone network includes a local exchange LE which is connected to the gateway mobile switching centre in the PLMN-network. This single connection between the two networks means that all signalling between the public switched telephone network PSTN and the PLMN-network must pass through the gateway mobile telephone services switching centre GMSC. A calling subscriber A1, the so-called A-subscriber, is permanently connected to the local exchange LE and the aforesaid mobile unit B1, which is the called subscriber, the so-called B-subscriber, communicates with the base station BS via a radio link. The radio link is shown in the Figure as a thick broken line. All of the permanent connections between the earlier recited nodes GMSC, HLR, MSC, BSC, BS, LE and A1 have been illustrated in the Figure by thick full lines. Signalling, which will be described in more detail further on, takes place, of course, over the permanent connections, although for the sake of clarity signalling has been drawn on one side of these connections. Signalling is illustrated with thin full lines. The arrow heads on the signalling lines illustrate the signalling directions. Signalling between the local exchange LE and the home location register HLR is transparent through the gateway MSC, which is shown in FIG. 1 with a thin full line which includes two-directional arrows and which is common to this signalling. The temporary compression of the signalling is intended to make the overview in FIG. 1 easier to follow. The signalling illustrated in FIG. 1 and necessary when carrying out the invention does not claim to represent the complete signalling procedure that is carried out when connecting a call. The Figure shows only the signalling in the two networks PSTN and PLMN, while the signalling to and from the two subscribers A1, B1 involved is disclosed in text. Neither does the Figure illustrate signalling which is considered to belong to known techniques.

The aforedescribed mobile telecommunication system PLMN operates in accordance with GSM-recommendations. It will be understood, however, that the described invention may also be used in similar type systems. The exemplifying embodiment described in detail below includes the service "Automatic callback when busy". As before mentioned, in the case of automatic callback, it is essential to be able to locate the called mobile subscriber B1 even when the mobile has moved geographically over a long distance and has entered a cell area which is handled by another visitor location register. The inventive method now presented is able to perform this essential function and comprises the following procedural steps:

The A-subscriber A1 calls the B-subscriber B1 and attempts to establish a call connection.

The A-subscriber A1 is informed that the B-subscriber B1 is busy with another caller, by means of a busy or engaged tone, i.e. a rapid sequence of short tone signals. These two steps are well known to the art and form part of conventional signalling techniques and will not therefore be described in detail here. The inventive method then includes the following further steps:

- The A-subscriber A1 dials the digit "5" on his telephone keypad, thereby requesting an "automatic callback when busy" service.
- The service request is forwarded to the local exchange LE.
- A message 1 "complete call" is sent from the local exchange LE to the home location register HLR, transparent through the gateway mobile services switching centre GMSC.
- The arrival of the message 1 at the home location register results in the creation of a reference number CRefi, which is placed last in a queue 10 in the home location register HLR. The queue is comprised of the references allocated to different subscribers who have attempted to establish a call to the B-subscriber. If no attempts to reach the B-subscriber B1 have earlier been made, the queue 10 is created and the reference CRefi of the message 1 "complete call" is placed first in the queue.
- The home location register HLR, which knows in which visitor location register the B-subscriber B1 is registered at that moment in time, diverts the message 1 "complete call" to the visitor location register VLR.
- The visitor location register VLR registers the message 1 "complete call" and sends to the home location register HLR a confirmation message 2 "complete call confirmed".
- The home location register HLR diverts the confirmation 2 "complete call confirmed" to the local exchange LE together with the reference CRefi transparent through the central mobile switching centre.
- The A-subscriber A1 is informed of the confirmation 2 by cessation of the busy tone, whereafter the A-subscriber releases his connection with the local exchange LE, by replacing his telephone receiver.
- The B-subscriber B1 is free to receive calls when an ongoing call with another subscriber is terminated.
- The local mobile telephone services switching centre of the B-subscriber B1 informs the visitor location register VLR of the new status of subscriber B1. This signalling has not been shown in FIG. 1.

A message 3 "B-free" is sent from the visitor location register VLR to the home location register HLR.

The home location register HLR confirms the message 3 "B-free" by sending a confirmation message 4 "B-free confirmed" to the visitor location register VLR.

The reference CRefi, which is now assumed to head the queue 10, is sent to the local exchange LE from the home location register HLR together with the message 3 "B-free", transparent through the gateway mobile services switching centre GMSC.

The A-subscriber A1 is informed by a rapid sequence of short ringing signals that the B-subscriber B1 is free to receive calls, and the A-subscriber acknowledges the message by lifting his telephone receiver, whereafter the local exchange LE is informed of the new status of the A-subscriber, i.e. that the A-subscriber has answered. This signalling between the A-subscriber A1 and the local exchange LE is a well-known technique and has not therefore been shown in the Figure.

An initial address message IAM1 containing the telephone number of the B-subscriber B1 is sent together with the reference CRefi from the local exchange LE to the gateway mobile switching centre GMSC.

The following three procedural steps belong to conventional signalling procedures in GSM-mobile telephony and have not therefore been illustrated in the Figure. The purpose of these three procedural steps is to find a mobile station roaming number MSRN1 which is assigned temporarily to the B-subscriber B1 while the connection is being established. In a later stage, this roaming number leads to the initial address message IAM1 sent to the local mobile services switching centre MSC used by the B-subscriber at that moment in time.

A query concerning the roaming number allocated to the B-subscriber B1 is sent to the home location register HLR from the gateway mobile services switching centre GMSC.

The home location register HLR, which contains information disclosing the visitor location register in which the B-subscriber B1 is registered at that time, diverts the reference/query to the visitor location register VLR.

The visitor location register VLR sends information relating to the roaming number of the B-subscriber B1 to the gateway mobile services switching centre GMSC via the home location register HLR.

The following procedural steps are shown in the Figure:

A connection is established from the A-subscriber A1 to the B-subscriber B1, by sending the initial address message IAM1 and the mobile station roaming number MSRN1 from the gateway mobile switching centre GMSC to the local mobile services switching centre MSC. According to the invention, the reference CRefi accompanies the initial address message IAM1 and the roaming number MSRN1. The reference is then forwarded to the visitor location register VLR.

The B-subscriber B1 is informed of the A-subscriber's call with a conventional signal, whereupon the B-subscriber answers the call by lifting his telephone receiver or by some corresponding action and the connection is therewith considered established.

The local mobile services switching centre MSC of the B-subscriber B1 informs the visitor location register VLR of the new status of the B-subscriber B1, i.e. that the B-subscriber has answered. This signalling is not shown in FIG. 1.

The visitor location register VLR sends a message 5 "B has answered" to the home location register HLR, together with the reference CRefi.

The home location register HLR removes the reference CRefi from the queue 10.

As an extra safety precaution when carrying out the aforesaid method, it is possible in accordance with the invention to allow the reference CRefi to accompany the query concerning the mobile services roaming number MSRN1 of the B-subscriber. In this case, the reference is transported from the gateway mobile switching centre to the local mobile switching centre along two different routes. In this regard, the reference CRefi is transported directly from the gateway mobile switching centre GMSC to the local mobile switching centre directly, in the aforedescribed manner, and also via the home location register HLR. This redundant transmission ensures transportation of the reference CRefi should the reference be lost for some reason or other when connecting a call, for instance as a result of collision with a call from another subscriber.

It should also be pointed out that when a mobile unit switches from one visitor location register to another register, signalling is effected in a manner which is conventional in conjunction with so-called roaming in a mobile telecommunication system or network. Procedures for locating mobile units are specified in GSM-recommendation 03.12. The inventive automatic callback procedure is not influenced by this "roaming", and the reference CRefi is always stored in the home location register HLR, which is informed of changes in the visitor location register.

Figure 1A:
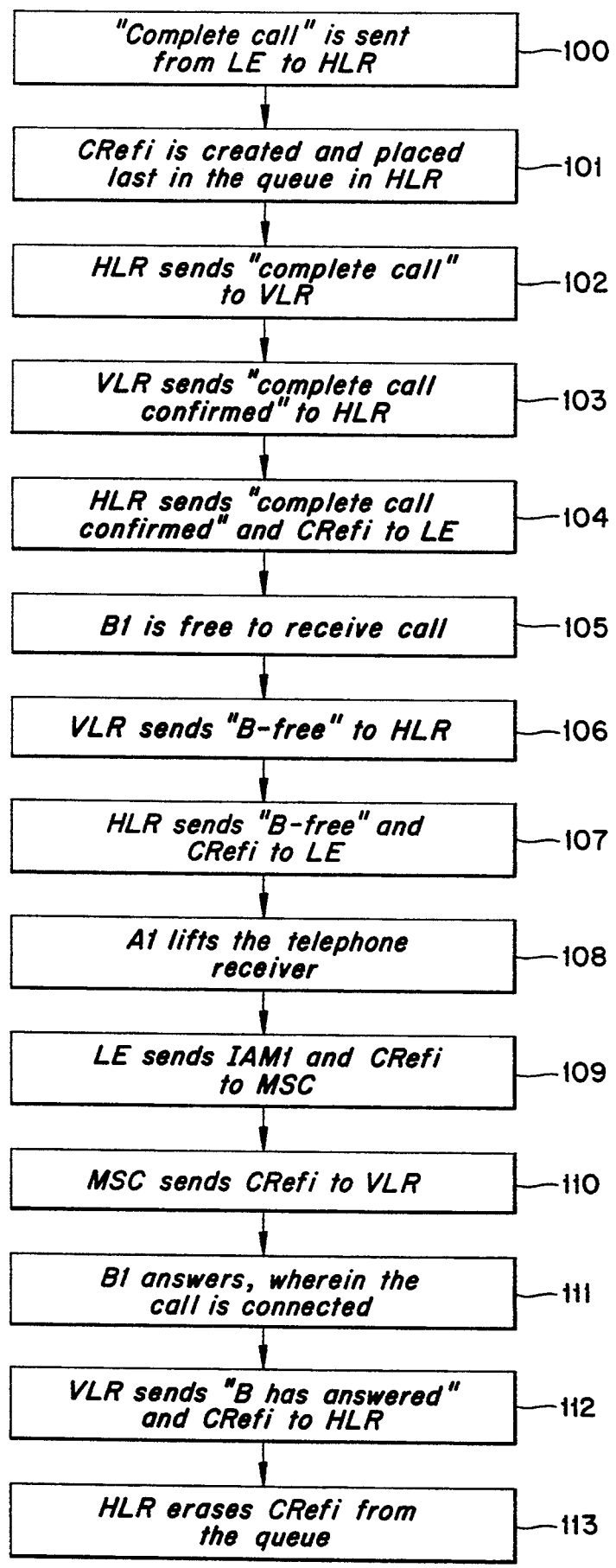
FIG. 1a is a flowsheet which discloses an inventive method in which the configuration according to FIG. 1 is used.

FIG. 1a is a flowsheet describing the aforesaid procedure. The flowsheet and the following simplified description of the procedures followed are intended to be read together with FIG. 1 and the text belonging to said Figure. The acronyms and abbreviations in the text of the flowsheet refer to FIG. 1, these acronyms and abbreviations having been explained in the example above. The method of procedure described with reference to the flowsheet commences after the A-subscriber A1 has called the B-subscriber B1 and requested the service "automatic callback when busy", after having received the busy tone. The method then continues in accordance with the following description and in accordance with FIG. 1a:

The message "complete call" is sent from the local exchange LE to the home location register HLR, in accordance with block 100.

The reference CRefi is created and placed last in the queue in the home location register HLR, in accordance with block 101.

The home location register HLR sends the message "complete call" to the visitor location register VLR, in accordance with block 102.

VLR sends the confirmation message "complete call—confirmed" to the home location register HLR, in accordance with block 103.

The home location register HLR sends the confirmation message "complete call confirmed" and the reference CRefi to the local exchange LE, in accordance with block 104.

The B-subscriber B1 becomes available to receive calls by terminating an ongoing call, in accordance with block 105. The local mobile services switching centre MSC of the B-subscriber B1 then informs the visitor location register of the new status of the B-subscriber.

The message "B-free" is sent from the visitor location register VLR to the home location register HLR, in accordance with block 106. The home location register HLR then confirms this message to the visitor location register VLR.

The reference CRefi and the message "B-free" are sent from HLR to the local exchange LE, in accordance with block 107.

The A-subscriber A1 is informed that the B-subscriber B1 is free to receive his call and the A-subscriber A1 lifts his telephone receiver, in accordance with block 108.

The initial address message IAM1 and the reference CRefi are sent from the local exchange LE to the local mobile services switching centre MSC, in accordance with block 109.

The reference CRefi is sent from the local mobile switching centre MSC to the visitor location register VLR, in accordance with block 110.

The call is connected with the aid of the initial address message IAM1 and the B-subscriber B1 answers, in accordance with block 111.

The visitor location register VLR sends the reference CRefi and the message "B has answered" to the home location register HLR, in accordance with block 112.

The home location register HLR removes CRefi from the queue, in accordance with block 113.

A further inventive method in which the same GSM-type public land mobile network PLMN as that described above in general terms is used will now be described. The exemplifying embodiment described in detail below refers to the service "Automatic callback when a called subscriber fails to answer". In this case, the calling subscriber is a mobile unit which belongs to the public land mobile network PLMN and the called subscriber is a unit permanently connected to the public network.

Figure 2:
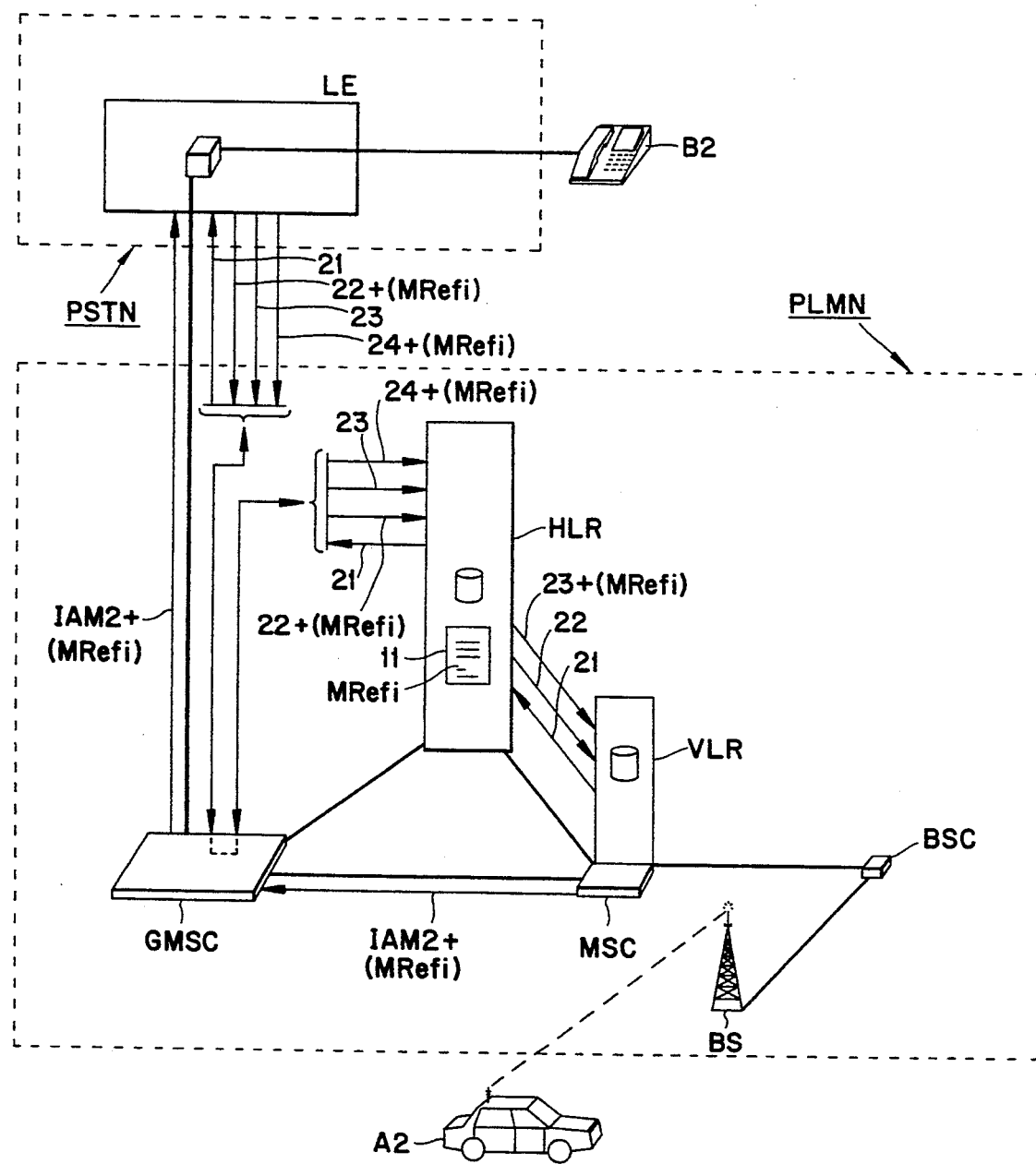
FIG. 2 is a schematic illustration of a traffic situation between a calling subscriber in a GSM-type mobile telecommunication network and a called subscriber in a land-bound public switched telephone network.

Similar to FIG. 1, FIG. 2 illustrates solely the local mobile services switching centre MSC, the base station controller BSC, the visitor location register VLR and the base station BS necessary to carry out the invention. A mobile unit A2 which belongs to the PLMN-network and which is located temporarily within a cell area which is controlled by a visitor location register VLR has earlier been described with reference to FIG. 1 and is registered temporarily in the visitor location register VLR and permanently in the earlier mentioned home location register HLR. As before mentioned, the home location register is always informed as to which visitor location register VLR the mobile unit A2 is registered at any given moment in time. FIG. 2 also illustrates those parts of the PSTN-network that are necessary for carrying out the invention, namely the local exchange LE. In this example, the mobile unit A2 is the calling subscriber, the so-called A-subscriber, and communicates with the base station BS via a radio link. The called subscriber B2, the so-called B-subscriber, is permanently connected to the local exchange LE.

The earlier description of drawing details with reference to FIG. 1 are applicable directly to FIG. 2. The signalling illustrated in FIG. 2 and necessary to the invention does not claim to be the complete signalling that is performed when connecting a call. The Figure illustrates only signalling in the two networks PSTN and PLMN, while signalling to and from the two subscribers A2, B2 involved is given solely in text. Neither does the Figure show the signalling that belongs to known techniques.

It is essential in the performance of an automatic callback service to locate the mobile, in this case the calling A-subscriber A2, when the calling subscriber has moved geographically over a long distance and entered a cell area which is handled by a visitor location register different to that in which the A-subscriber was registered when initiating the call. The inventive method presented below is able to carry out this essential function and comprises the following procedural steps:

The A-subscriber A2 attempts to establish a call connection with the B-subscriber B2.

The A-subscriber A2 is informed that the B-subscriber B2 "does not answer the call", by means of a ringing control tone which is not followed by an answer. These two steps are well known to the art and the signalling procedure involved belong to conventional techniques and will not therefore be described in detail. The inventive method then comprises the following further steps:

The A-subscriber A2 requests the service "automatic callback when a called subscriber does not answer", by dialling the "2"-digit on his telephone keypad.

This request is forwarded to the visitor location register VLR by signalling conventionally via the base station BS, the base station controller BSC and the local mobile telephone switching centre MSC. This signalling has not been shown in FIG. 2.

A message 21 "complete call" is sent from the visitor location register VLR to the home location register HLR.

The home location register HLR diverts the message 21 "complete call" to the local exchange LE, transparent through the GMSC-centre.

The local exchange LE registers the message 21 "complete call" and sends to the home location register HLR a confirmation signal 22 "complete call—confirmed" together with a reference MRefi, transparent through the GMSC-centre.

The reference MRefi is stored in a memory location 11 in the home location register HLR, this memory location belonging to the A-subscriber A2 and containing references for the establishment of connections to different subscribers from the A-subscriber.

The home location register HLR diverts the confirmation 22 "complete call confirmed" to the visitor location register VLR.

The A-subscriber A2 is informed of the confirmation 22, whereafter the A-subscriber releases his connection with the PLMN-network.

The B-subscriber B2 is activated, for instance by the B-subscriber lifting his telephone receiver or in some other way, to show that he is free to receive calls.

The B-subscriber B2 informs the local exchange LE of his new status through a conventional signalling procedure. This signalling has not been shown in FIG. 2.

A message 23 "B-free" is sent from the local exchange LE to the home location register HLR, transparent through the GMSC-centre.

The home location register HLR diverts the "B-free" message 23 with the reference MRefi to the local MSC via the visitor location register VLR.

The A-subscriber A2 is informed that the B-subscriber B2 is free to receive calls, for instance by means of a rapid sequence of short ringing signals. The A-subscriber acknowledges this information, for instance by lifting his telephone receiver, whereafter the local MSC is informed of the new status of the A-subscriber, i.e. that the A-subscriber has acknowledged that the call can be connected. The signalling effected between the A-subscriber A2 and the local MSC is a well-known technique and has not therefore been shown in the Figure.

The call is connected in accordance with known procedures, by sending an initial address message IAM2 together with the telephone number of the B-subscriber and the reference MRefi from the local MSC to the local exchange LE, transparent through the GMSC-centre.

The B-subscriber B2 is informed of the call from the A-subscriber A2, by means of conventional ringing signals, and the B-subscriber answers the call by lifting his telephone receiver. The call is therewith considered to be connected.

The B-subscriber B2 informs the local exchange LE of his new status, i.e. that the B-subscriber has answered, by a conventional signalling procedure, this signalling procedure not being shown in FIG. 2.

The local exchange LE sends a "B-answered" message 24 together with the reference MRefi through the home location register HLR, transparent through the GMSC-centre.

The home location register HLR removes the reference MRefi from its memory location 11.

Figure 2A:
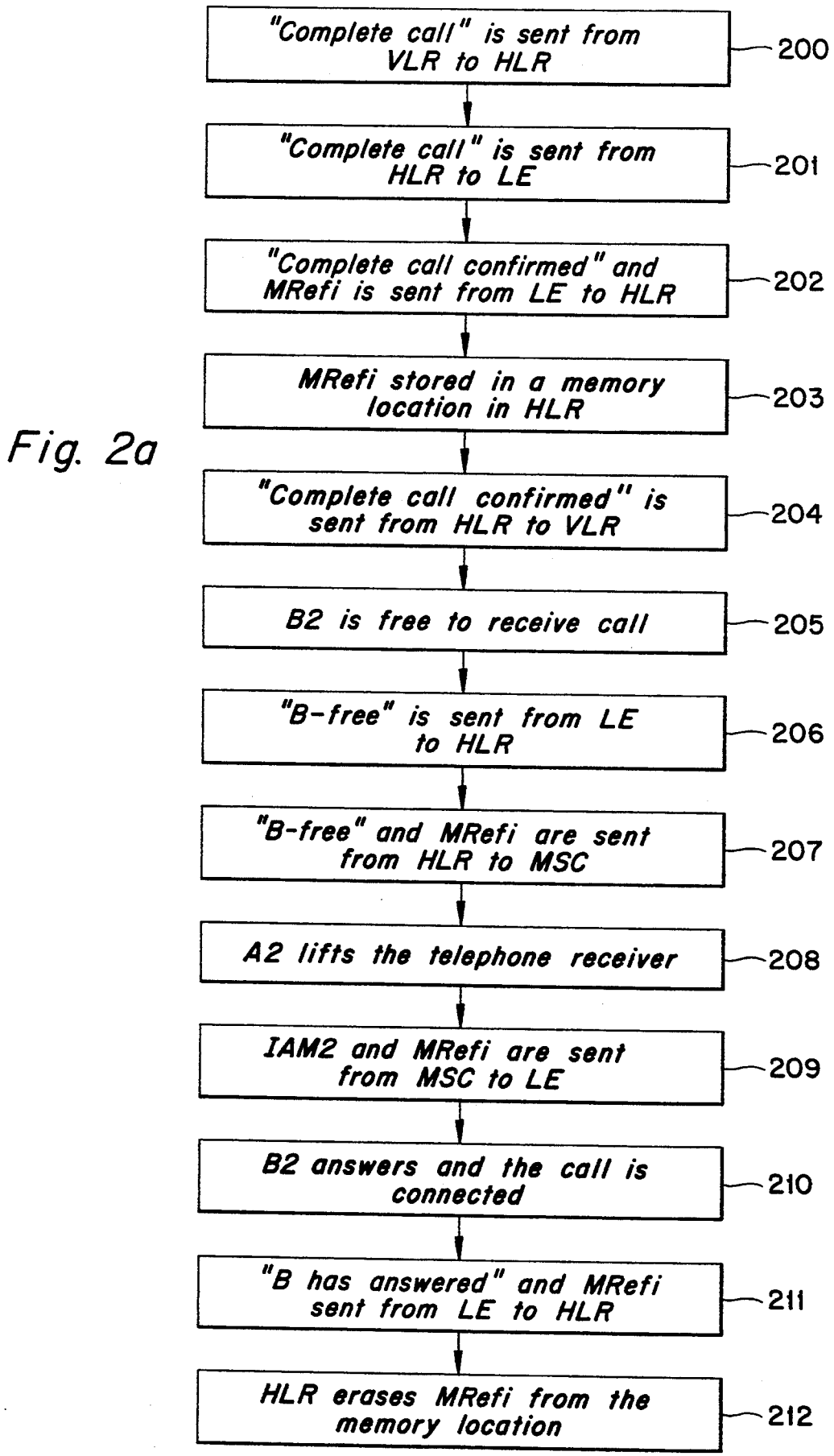
FIG. 2a is a flowsheet illustrating an inventive method in which the configuration illustrated in FIG. 2 is used.

FIG. 2a is a flowsheet which illustrates the aforedescribed method. The flowsheet and the following simplified description of the method are intended to be read together with FIG. 2 and the descriptive text relating to this Figure. The abbreviations and anagrams included in the text on the flowsheet have been explained in the aforegoing example and refer to FIG. 2. The method described with reference to the flowsheet commences at a point after the A-subscriber A2 has called the B-subscriber B2 and requested the service "automatic callback when a called subscriber fails to answer" after having received the ringing control tone which is not followed by an answer. The method then proceeds in accordance with the following description and in accordance with FIG. 2a:

The "complete call" message is sent from the visitor location register VLR to the home location register HLR, in accordance with block 200.

The home location register HLR diverts the "complete call" message to the local exchange LE, in accordance with block 201.

The local exchange LE sends the confirmation message "complete call confirmed" and the reference MRefi to the home location register HLR, in accordance with block 202.

The reference MRefi is stored in a memory location memory 11 in the home location register HLR, in accordance with block 203.

The home location register HLR diverts the confirmation message 22 "complete call confirmed" to the visitor location register VLR, whereafter the A-subscriber is informed, in accordance with block 204.

The B-subscriber B2 is activated and becomes available for the call connection. The B-subscriber B2 then informs the local exchange LE of his new status, in accordance with block 205.

The message "B-free" is sent from the local exchange LE to the home location register HLR, in accordance with block 206.

The home location register HLR diverts the "B-free" message to the local MSC together with the reference MRefi, in accordance with block 207.

The A-subscriber A2 is informed that the B-subscriber B2 is free to receive calls, and the A-subscriber acknowledges this information by lifting his telephone receiver or by some corresponding mobile telephone procedure. The local MSC is then informed of the new status of the A-subscriber, i.e. that the A-subscriber has acknowledged that the call can be connected, in accordance with block 208.

The initial address message IAM2 is sent from the local MSC to the local exchange LE, together with the reference, in accordance with block 209.

The B-subscriber B2 is informed of the call from the A-subscriber A2, whereupon the B-subscriber answers the call by lifting his telephone receiver and the call is therewith considered to have been established, in accordance with block 210. The B-subscriber B2 herewith informs the local exchange LE of his new status.

The local exchange LE sends the message "B has answered" to the home location register HLR together with the reference MRefi, in accordance with block 211.

The home location register HLR erases the reference MRefi from said memory location, in accordance with block 212.

The aforedescribed exemplifying embodiment of the service "Automatic callback when a called subscriber does not answer the call" has been described with reference to the case when the calling subscriber is a mobile unit and the called subscriber is permanently connected to the land-bound public switched telephone network. It will be understood, however, that the service can be performed in accordance with the invention in all cases when either one or both of the two subscribers involved is or are a mobile unit/mobile units. This also applies to the earlier described exemplifying embodiment relating to "Automatic callback when a called subscriber is busy with another call".

A further inventive method will now be described. This method utilizes the same GSM-type PLMN-network as that described in general terms above. The exemplifying embodiment described in detail below relates to a service "Automatic callback when a called subscriber is busy with another call". In this case, the calling subscriber and the called subscriber are both mobile units belonging to the PLMN-network.

Figure 3:
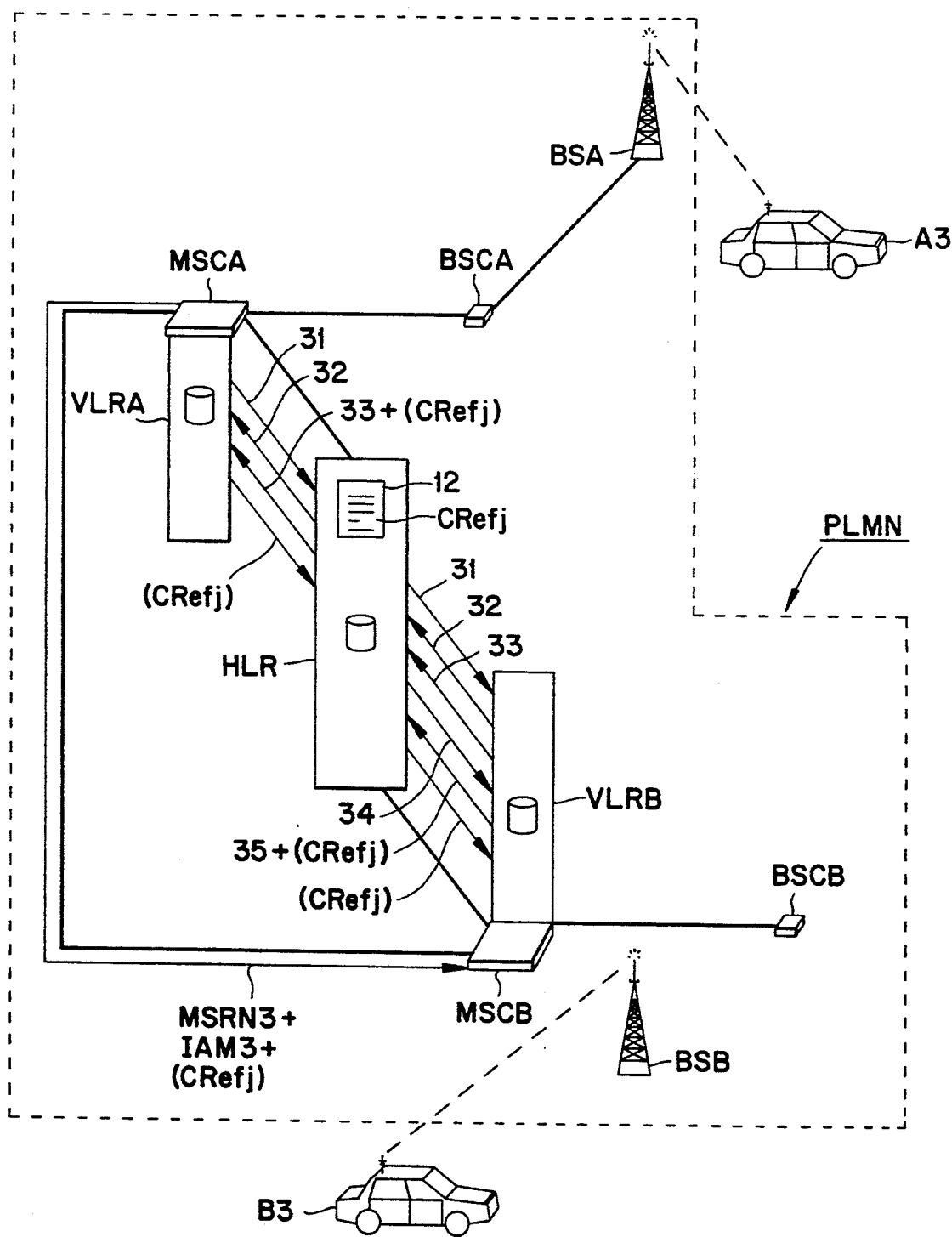
FIG. 3 is a schematic block illustration of a traffic situation between a calling and a called subscriber in a GSM-type mobile telecommunication network.

As with the earlier Figures, FIG. 3 only illustrates those units of a PLMN-network that are necessary in performing the invention. The PLMN-network includes a home location register HLR, the function of which has been described in the earlier embodiments. In the FIG. 3 embodiment, the home location register HLR is connected to two mobile services switching centres, here referred to as first and second local mobile services switching centres MSCA and MSCB. The remaining switching centres connected to the home location register have been excluded from the Figure for the sake of clarity. Each of the two mobile switching centres is connected to a respective base station control unit, referred to respectively as first and second base station control units BSCA and BSCB. Each of the base station control units is connected to a respective base station, referred to as first and second base stationsd BSA and BSB. Each of the MSCA and MSCB centres includes a respective visitor location register, referred to here as first and second visitor location registers VLRA and VLRB respectively. A first mobile unit A3 belonging to the PLMN-network and located temporarily within a cell area controlled by the first visitor location register VLRA is registered temporarily in the visitor location register VLRA and permanently in the home location register HLR, similar to that described with reference to the earlier embodiments. This also applies to a second mobile unit B3 which is located within another cell area and controlled by the second visitor location register VLRB. In the illustrated embodiment, the first mobile unit A3 is the calling subscriber, the so-called A-subscriber, and the second mobile unit B3 is the called subscriber, the so-called B-subscriber. As earlier described, the home location register is always informed of which visitor location register VLRA or VLRB the mobile units A3 and B3 are registered at any moment in time. The communication between the mobile units and the PLMN-network functions in the same way as that described earlier. The technical details drawn in the earlier Figures also apply to FIG. 3. The signalling illustrated in FIG. 3 and necessary to the invention does not claim to represent the full signalling procedure that is effected when setting-up a call connection. The Figure illustrates only the signalling that is effected in the PLMN-network, while signalling to and from the two subscribers A2, B3 involved is disclosed solely in the form of text. Neither does the Figure show signalling that belongs to the known technique.

When performing an automatic callback service, it is essential to be able to locate the mobile subscribers concerned, in this case the calling A-subscriber A3 and the called subscriber B3. This also applies to those instances when one or both of the subscribers has/have moved geographically over a long distance and entered a cell area that is handled by a different visitor location register to that in which the subscribers were registered when initiating the call. The inventive method presented below is able to perform this essential function and comprises the following procedural steps:

The A-subscriber A3 calls the B-subscriber B3 with the intention of setting-up a call connection.

The A-subscriber A3 is informed that the B-subscriber B3 is busy with a call from another subscriber, by means of a busy tone, i.e. a rapid sequence of short tone signals. These two steps are well-known to the art and the signalling procedure forms part of conventional techniques and has not therefore been described in detail. The inventive method further comprises the following steps:

The A-subscriber A3 dials the "5" digit on his telephone keypad, therewith requesting the service "Automatic callback when a called subscriber is busy with another call".

The A-subscriber A3 informs the first visitor location register VLRA of his new status, by signalling via the first base station BSA, the first base station control unit VSCA and the first local MSCA-centre. This signalling is of a conventional kind and has therefore not been shown in FIG. 3.

A message 31 "complete call" is sent from the first visitor location register VLRA to the home location register HLR.

When the message 31 arrives at the home location register HLR, there is created a reference CRefj which is placed last in a queue 12 in the home location register. The queue contains references which identify different subscribers that have attempted to call the B-subscriber. If no earlier attempts to reach the B-subscriber B3 have been made, the queue 12 is created and the reference CRefj of the message 31 "complete call" is placed first in the queue.

The home location register HLR, which is aware of which visitor location register the B-subscriber B3 is registered at that particular time, diverts the "complete call" message 31 to the second visitor location register VLRB.

The second visitor location register VLRB registers the "complete call" message and sends a confirmation message 32 "complete call confirmed" to the home location register HLR.

The home location register HLR diverts the confirmation message 32 "complete call confirmed" to the first visitor location register VLRA.

The A-subscriber A3 is informed of the confirmation 32, whereafter the A-subscriber releases his connection with the PLMN-network.

The B-subscriber B3 becomes available to receive calls, when terminating an ongoing call with another subscriber.

The local mobile services switching centre MSCB of the B-subscriber B3 informs the second visitor location register VLRB of the new status of subscriber B3. This signalling is considered to be well-known and has not therefore been shown in FIG. 3.

A message 33 "B-free" is sent from the second visitor location register VLRB to the home location register HLR.

The home location register HLR confirms the message 33 "B-free" by sending a confirmation message 34 "B-free confirmed" to the second visitor location register VLRB.

The reference CRefj, which is now assumed to head the queue 12, is sent from the home location register HLR to the first visitor location register VLRA, together with the "B-free" message 33.

The A-subscriber A3 is informed that the B-subscriber B3 is free to receive calls, for instance by means of a rapid sequence of short ringing signals, and the A-subscriber acknowledges the information. The first visitor location register VLRA is informed of the new status of the A-subscriber, i.e. that the A-subscriber has acknowledged that the call shall be connected. Signalling between the A-subscriber and the first visitor location register VLRA is a well-known technique and has therefore not been shown in the Figure.

The following three procedural steps belong to conventional signalling procedure in GSM-mobile telephony and have not therefore been shown in the Figure. The purpose of these three procedural steps is to find a mobile station roaming number MSRN3 that can be allocated to the B-subscriber B3 temporarily while setting-up the connection. In a later stage, this roaming number results in an initial address message IAM3 with the telephone number of the B-subscriber B3 to the local telephone exchange used at that moment by the B-subscriber.

A query concerning the roaming number of the B-subscriber B3 is sent from the first local MSCA-centre to the home location register HLR.

The home location register HLR, which includes information as to the visitor location register which the B-subscriber B3 is registered at that time, diverts the reference/query to the second visitor location register VLRB.

The second visitor location register VLRB sends to the first MSCA-centre information relating to the roaming number of the B-subscriber B3, via the home location register HLR.

The following procedural steps are shown in the Figure:

A connection is established from the A-subscriber A3 to the B-subscriber B3, by sending an initial address message IAM3 and the mobile station roaming number MSRN3 from the first local MSCA-centre to the second MSCB-centre. According to the present invention, the reference CRefj accompanies the initial address message IAM3 and the roaming number MSRN3. The reference is then forwarded to the second visitor location register VLRB.

The B-subscriber B3 is informed of the call from the A-subscriber A3 by conventional signalling, wherewith the B-subscriber answers the call by lifting his telephone receiver, or by carrying out some other corresponding mobile telephone procedure, and the call is considered to have been connected.

The local mobile services switching centre of the B-subscriber B3 informs the second visitor location register VLRB of the new status of the B-subscriber, i.e. that the B-subscriber has answered. This signalling is considered to be conventional and has therefore not been shown in FIG. 3.

The second visitor location register VLRB sends to the home location register HLR a "B has answered" message 35 together with the reference CRefj.

The home location register HLR removes the reference CRefj from the queue 12.

As an additional safety precaution, it is possible when carrying out the inventive method to allow the reference CRefj to accompany the query concerning the roaming number MSRN3 of the B-subscriber. This reference is then transported from the first local mobile services switching centre MSCA to the second local mobile services switching centre MSCB, along two different routes. In this regard, the reference CRefj is transported directly from the first local MSCA-centre to the second local MSCB-centre as earlier described, and also through the home location register HLR. This redundant transmission ensures transportation of the reference CRefj even should the reference be lost at the time of connecting the call for some reason or other, for instance as a result of collision with a call from another subscriber.

Figure 3A:
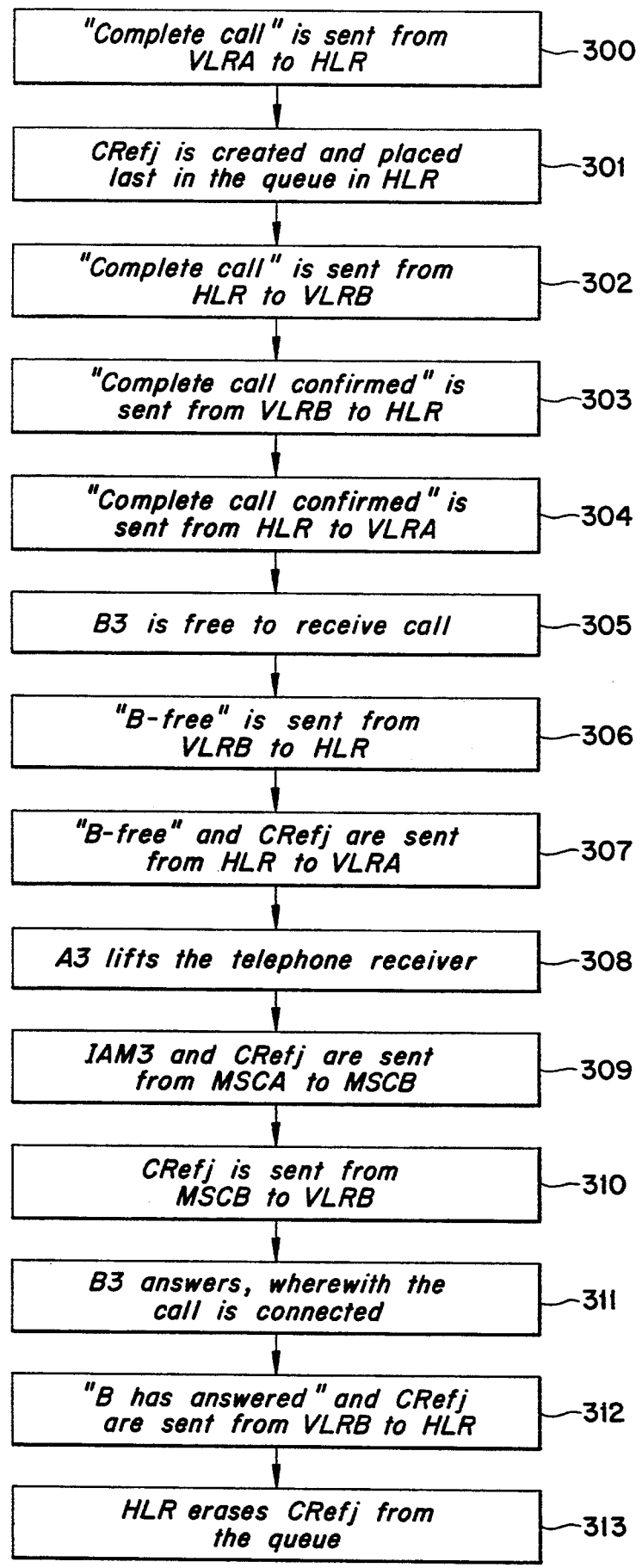
FIG. 3a is a flowsheet illustrating an inventive method in which there is used a configuration according to FIG. 3.

FIG. 3a is a flowsheet illustrating the aforedescribed method. The flowsheet and the following simplified description of the method are intended to be read together with FIG. 3 and the text associated with said Figure. The abbreviations and acronyms used in the text on the flowsheet have been explained in conjunction with the description of the earlier embodiment and refer to FIG. 3. The method described with reference to the flowsheet commences at a point after the A-subscriber A3 has called the B-subscriber B3 and requested the service "automatic callback when a called subscriber is busy with another call", after having received the busy tone. The method then proceeds in accordance with the following description and in accordance with FIG. 3a:

The message "complete call" is sent from the first visitor location register VLRA to the home location register HLR, in accordance with block 300.

The reference CRefj is created and placed last in a queue in the home location register, in accordance with block 301.

The home location register HLR forwards the message "complete call" to the second visitor location register VLRB, in accordance with block 302.

The second visitor location register VLRB sends a confirmation message "complete call confirmed" to the home location register HLR, in accordance with block 303.

The home location register HLR forwards the confirmation "complete call confirmed" to the first visitor location register VLRA, in accordance with block 304. The A-subscriber A3 is informed of this confirmation, whereafter the A-subscriber releases the connection, by replacing his telephone receiver or by some corresponding mobile telephone procedure.

The B-subscriber B3 becomes free to receive calls, by terminating an ongoing call with another subscriber. The mobile services switching centre MSCB of the B-subscriber B3 informs the second visitor location register VLRB of the new status of the B-subscriber, in accordance with block 305.

A message "B-free" is sent from the second visitor location register VLRB to the home location register HLR, in accordance with block 306.

The reference CRefj is sent from the home location register HLR to the first visitor location register VLRA together with the "B-free" message. The A-subscriber A3 is informed that the B-subscriber B3 is available to receive calls.

The A-subscriber lifts his telephone receiver or performs some corresponding mobile telephone procedure, in accordance with block 308. The first visitor location register VLRA is informed of the new status of the A-subscriber, i.e. that the A-subscriber has answered.

A connection is established from the A-subscriber A3 to the B-subscriber B3, by sending an initial address message IAM3 and the reference from the first local mobile services switching centre MSCA to the second mobile services switching centre MSCB, in accordance with block 309.

The reference is forwarded from MSCB to the second visitor location register VLRB, in accordance with block 310.

The B-subscriber B3 is informed of the call from A-subscriber A3, and the B-subscriber responds to the call by lifting his telephone receiver, or by carrying out some other corresponding telephone procedure, and the call is considered to have been connected, in accordance with block 311. The local mobile services switching centre of the B-subscriber B3 informs the second visitor location register VLRB of the new status of the B-subscriber, i.e. that the B-subscriber has answered.

the second visitor location register VLRB sends a "B has answered" message to the home location register HLR together with the reference CRefj, in accordance with block 312.

The home location register HLR erases the reference CRefj from the queue, in accordance with block 313.

In the exemplifying embodiments described above, the automatic callback service has been presented in three normally occurring traffic cases, namely cases in which:

1. A calling A-subscriber is permanently connected to the land-bound telephone network and a called B-subscriber is a mobile unit.
2. A calling A-subscriber is a mobile unit and a called B-subscriber is permanently connected to the land-bound telephone network.
3. A calling A-subscriber and a called B-subscriber are both mobile units that are located in cells which are handled by different visitor location registers in a mobile telecommunication network.

Certain configuration variants are possible in the third traffic case. For instance, the two mobile units may be located in cells that are handled by one and the same visitor location register. It will readily be seen that the invention is able to locate the two subscribers even in this case. It is also conceivable that the mobile units may be located in different mobile telecommunication networks and that these units can be located by different home location registers. This configuration necessitates passing through a public switched telephone network prior to establishing a call connection. This is achieved in accordance with the invention with a combination of the first and the second embodiments. As will be understood, several other variants of the three embodiments described are conceivable, and it will be obvious to the person skilled in this art that these embodiments do not limit the use of the invention. It is also possible for certain mobile telecommunication networks to include more than one home location register. This variant has no limiting effect on the scope of the invention, however, but shall be seen merely as a variation of the aforedescribed case where the mobiles belong to different mobile telecommunication networks, but with the difference that the public switched telephone network need not be passed. As before mentioned, the invention can be applied to all mobile telecommunication systems in which the mobile units are registered centrally in the system, for instance the digital American system, ADC. This also implies that the term mobile unit used in this document may be given different interpretations, depending on whether the mobile telecommunication network handles vehicle-carried subscribers, pedestrian subscribers, paging systems, data terminals, etc.

It will be understood that the invention is not restricted to the aforedescribed and illustrated exemplifying embodiments thereof and that modifications can be made within the scope of the following claims.

What is claimed is:

1. A method of completing a telephone call in a telecommunication system comprising a public switched telephone network (PSTN) and a public land mobile network (PLMN), wherein the networks are mutually linked by a gateway mobile services switching center (GMSC), and a calling subscriber, a so-called A-subscriber, is connected to a local exchange (LE) in the PSTN, and a called subscriber, a so-called B-subscriber, is a mobile unit which is able to communicate via a local mobile services switching center (MSC) in the PLMN and which is permanently registered in a home location register (HLR) and temporarily registered in a visitor location register (VLR) known by the HLR, the VLR belonging to the local MSC, the method comprising the steps of:

when the A-subscriber calls the B-subscriber, informing the A-subscriber that the B-subscriber is "not available";
requesting a service "complete telephone call" by the A-subscriber's dialing a predetermined code;
sending a "complete call" message from the LE to the HLR;
in response to the "complete call" message, inserting a reference (CRefi) at a bottom of a queue in the HLR, the queue belonging to the B-subscriber and containing references of attempts made by different subscribers to be connected to the B-subscriber;
the HLR's diverting the "complete call" message to the VLR;
registering the "complete call" message in the VLR and sending a confirmation message "complete call confirmed" from the VLR to the HLR;
sending the confirmation message from the HLR to the LE with the reference (CRefi);
informing the A-subscriber of the confirmation message, whereafter the A-subscriber releases the connection to the LE;
when the B-subscriber becomes free to accept calls, sending a message "B-free" from the VLR to the HLR;
confirming the "B-free" message by sending a confirmation message "B-free confirmed" from the HLR to the VLR;
sending the reference (CRefi) positioned at a top of the queue from the HLR to the LE with the "B-free" message, and informing the A-subscriber that the B-subscriber is
when the A-subscriber is free, establishing a call connection to the A-subscriber with an initial address message, wherein the reference (CRefi) accompanies the initial address message from the LE to the GMSC and from the GMSC to the local MSC, whereafter the reference (CRefi) is forwarded to the VLR;
when the B-subscriber answers the call, sending the message "B has answered" from the VLR to the HLR with the reference (CRefi); and
the HLR's removing the reference (CRefi) from the queue.

2. The method of claim 1, wherein during the step of establishing the call connection, the reference (CRefi) is also sent from the GMSC to the VLR via the HLR.

3. A method of completing a telephone call in a telecommunication system comprising a pubic switched telephone network (PSTN) and a public land mobile network (PLMN), wherein the networks are mutually linked by a gateway mobile services switching center (GMSC), and a calling subscriber, a so-called A-subscriber, is a mobile unit which communicates via a local mobile services switching center (MSC) in the PLMN, and a called subscriber, a so-called B-subscriber, is connected to a local exchange (LE) in the PSTN, and the A-subscriber is permanently registered in a home location register (HLR) and temporarily registered in a visitor location register (VLR) known by the HLR, the VLR belonging to the local MSC, the method comprising the steps of:

when the A-subscriber calls the B-subscriber, informing the A-subscriber that the B-subscriber is "not available";
the A-subscriber dialing a code requesting a service "complete telephone call";
sending a message "complete call" from the VLR to the HLR;
the HLR diverting the "complete call" message to the LE;

the LE registering the "complete call" message and sending a confirmation message "complete call confirmed" to the HLR with a reference (MRefi);

storing the reference (MRefi) in a memory location in the HLR, the memory location belonging to the A-subscriber and containing references for connection attempts to different subscribers from the A-subscriber;

the HLR diverting the confirmation "complete call confirmed" to the VLR;

informing the A-subscriber of the confirmation "complete call confirmed", whereafter the A-subscriber releases the connection with the PLMN;

when the B-subscriber becomes free to receive calls, sending a message "B-free" from the LE to the HLR;

the HLR diverting the "B-free" message and the reference (MRefi) to the local MSC via the VLR, whereafter the A-subscriber is informed that the B-subscriber is free to receive the call;

establishing a call connection with an initial address message when the A-subscriber is free, wherein the reference (MRefi) accompanies the initial address message from the local MSC to the LE, via the GMSC;

when the B-subscriber answers the call, sending a message "B has answered" from the LE to the HLR with the reference (MRefi); and the HLR removing the reference (MRefi) from the memory location.

4. A method of completing a telephone call in a telecommunication system comprising a public land mobile network in which a calling subscriber, a so-called A-subscriber, is a mobile unit which communicates via a first local mobile services switching center (MSCA) and in which a called subscriber, a so-called B-subscriber is a mobile unit which communicates via a second local mobile services switching center (MSCB), wherein the A-subscriber and B-subscriber are permanently registered in a home location register (HLR) and are temporarily registered in respective visitor location registers (VLRA, VLRB) which are known to the HLR, each of the VLRA and the VLRB belonging to one of MSCA and MSCB, the method comprising the steps of:

when the A-subscriber calls the B-subscriber, informing the A-subscriber that the B-subscriber is "not available";

the A-subscriber dialing a code requesting a service "complete telephone call";

sending a message "complete call" from the VLRA to the HLR;

in response to the "complete call" message, placing a reference (CRefj) last in a queue in the HLR, the queue belonging to the B-subscriber and containing references to different subscribers who have attempted to be connected to the B-subscriber;

the HLR diverting the "complete call" message to the VLRB;

the VLRB registering the "complete call" message and sending a confirmation message "complete call confirmed" to the HLR;

the HLR forwarding the confirmation message "complete call confirmed" to the VLRA;

informing the A-subscriber of the confirmation message "complete call confirmed", whereafter the A-subscriber releases the connection with the public land mobile network;

when the B-subscriber becomes available to receive calls, sending a message "B-free" from the VLRB to the HLR;

the HLR confirming the "B-free" message by sending a confirmation message "B-free confirmed" to the VLRB;

sending the first reference (CRefj) in the queue from the HLR to the VLRA with the "B-free" message, whereafter the A-subscriber is informed that the B-subscriber is free;

establishing a call connection with an initial address message when the A-subscriber is free, wherein the reference (CRefj) accompanies the initial address message when the message is sent from the MSCA to the MSCB, whereafter the reference is forwarded to the VLRB;

when the B-subscriber (B3) answers the call, sending from the VLRB to the HLR a message "B has answered" with the reference (CRefj); and the HLR erasing the reference (CRefj) from the queue.

5. The method of claim 4, wherein during the step of establishing the call connection, the reference (CRefj) is also sent from the VLRA to the VLRB via the HLR.

* * * * *